Nov. 15, 1938.    L. SAIVES    2,137,145
SERVO-BRAKE FOR MOTOR VEHICLES
Filed Aug. 4, 1937
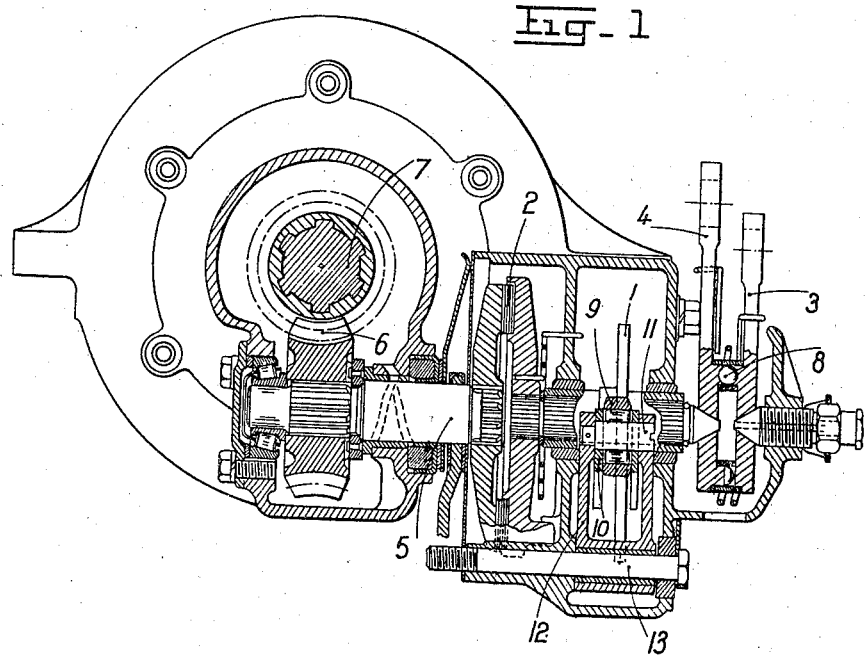
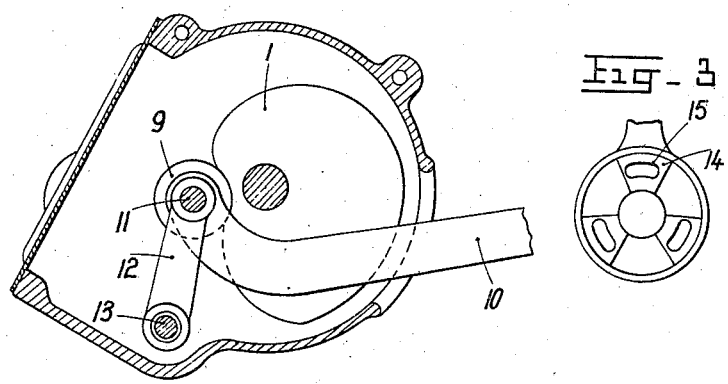
L. Saives
Inventor
By Glascock Downing & Seebold
Attys.

Patented Nov. 15, 1938

2,137,145

UNITED STATES PATENT OFFICE 2,137,145

SERVO-BRAKE FOR MOTOR VEHICLES

Leon Saives, Billancourt, France, assignor to Louis Renault, Billancourt, France Application August 4, 1937, Serial No. 157,431
In France February 12, 1937

2 Claims. (Cl. 188—140)

The present invention relates to servo-brakes in which the rod-and-link gear which is connected to the brake parts is acted upon by a cam which is coupled to a driving device by means of a clutch which is thrown on when the driver presses down his pedal, the said cam being so arranged as to act upon the rod-and-link gear for both directions of running of the vehicle.

In such servo-brakes, the cam usually acts upon a roller which is mounted at the middle of a lever, one of whose ends operates in a fixed pivot joint, while the other end is connected to a rod of the rod-and-link gear. This construction has various drawbacks, among which the following may be mentioned.

1. The action of the cam upon a roller mounted at the middle of the lever can be decomposed into two forces, one of which is applied to the pivot joint of the lever and has no useful effect, while it subjects this joint to a considerable force.

2. The thrust of the cam upon the roller and its joint is quite considerable, and is much greater than the force exerted, at the end of the levers, upon the rod-and-link gear.

3. As the amount of the movement of the roller is small, use is made of only a reduced rotation of the cam, which must be subjected to a considerable torque, thus requiring the use of a powerful clutch having friction discs of a large diameter.

The present invention has for its object to obviate the aforesaid drawbacks, and it is essentially characterized by the fact that the thrust roller is mounted directly on the end of a rod whose other end acts upon the other parts of the rod-and-link gear. In this manner, the roller is not subjected to a greater force than the one exerted upon the rod-and-link gear. On the other hand, the movement of the cam is increased, and the torque which is applied to it is reduced for two reasons, i. e. a less force upon the roller and a greater reduction ratio of the cam, thus enabling the use of a clutch of reduced power, i. e., having friction discs of smaller diameter. The said roller may be guided in its movement by any suitable means, and chiefly by a pivoted lever, and in this case, the said lever is not used to transmit the braking force and is only subjected to limited forces, on the contrary to the device whose drawbacks have been above mentioned.

The accompanying drawing shows by way of example an embodiment of the invention.

Fig. 1 is a section of a servo-frein on the axis of the clutch.

Fig. 2 shows the arrangement for driving the rod-and-link gear by means of the cam mounted on the driven shaft of the clutch.

Fig. 3 shows a detail.

The cam 1 which participates in the driving of the rod-and-link gear is mounted on the driven shaft of the clutch 2 which is thrown on by the rotation of the lever 3, which, by the effect of inclined parts, causes the separation of the combined lever 4 and the axial displacement of the driven part of the clutch. The lever 3 is connected to the control device, such as the brake pedal, and the lever 4 is connected to the rod-and-link gear. The driving part 5 of the clutch is actuated, through a gear wheel 6, by the shaft 7 which is connected to a transmission device of the vehicle which is joined to the wheels.

When the parts 5—6—7 are not in motion (the vehicle being stopped), the said clutch serves simply as a stop, in order to limit the separation of the levers 3—4 which are rotated, one by the other, through the medium of balls 8 which are acted upon by the inclined parts formed upon the adjacent faces of the hubs of the levers 3—4.

On the contrary, when the parts 5—6—7 are in motion, the driven part of the clutch will actuate the cam 1. In conformity with the invention, the said cam acts upon a roller 9 mounted directly by means of a spindle 11 upon one end of a rod 10 whose other end is connected to the other parts of the rod-and-link gear. Said spindle 11 is also carried at one end of a short arm 12 which is pivoted at a fixed point as at 13, thus permitting a limited, arcuate movement of the roller 9 around the axis 13.

The adjacent faces of the discs carrying the inclined parts are preferably formed as shown in Fig. 3; in the inclined parts 14 are provided recesses 15 having the form of segments of a circle, which serve as races for the balls 8. Thus the balls, which are accurately guided, have no friction upon the peripheral walls, thus preventing a considerable loss of efficiency when transforming the force on the brake pedal into pressure upon the discs of the clutch 2.

I claim:

1. A servo-brake for motor vehicles, comprising a cam which is rotatable on an axis, a coupling device between a driving element and the cam, a device for throwing on the said coupling device when acting upon the brake pedal, a connecting rod moved longitudinally and actuating the brakes at one of its ends, a roller mounted at the other end of said connecting rod at the end of a guiding pivoted lever and in contact with said cam, in such a manner that, by turning the same during the braking, said cam will drive said roller in the direction corresponding to the traction upon said connecting rod, whereby the pivoted lever ensures only the guiding of said roller in this direction without transmitting the braking force.

2. A servo-brake for motor vehicles, comprising a cam rotatable on an axis, a coupling device between a driving element and the cam, a device for throwing in said coupling device when acting upon the brake pedal, a connecting rod longitudinally movable in actuating the brakes at one of its ends, a spindle mounted at the other end of said connecting rod, a guide arm having its free end pivoted on said spindle and its other end pivoted at a fixed point, a roller mounted on said spindle and contacting with said cam whereby said cam will cause said roller to describe an arcuate movement around said fixed point upon the brakes being applied, and in the direction of traction upon said connecting rod.

LEON SAIVES.